United States Patent
Bast

[15] 3,668,031
[45] June 6, 1972

[54] METHOD OF MAKING FOAM CORE SANDWICH PANEL

[72] Inventor: Bernard J. Bast, Bethlehem, Pa.
[73] Assignee: Bethlehem Steel Corporation
[22] Filed: Mar. 3, 1970
[21] Appl. No.: 16,179

[52] U.S. Cl. ................................. 156/79, 18/12 F, 264/45, 264/47
[51] Int. Cl. ........................................................... B32b 5/18
[58] Field of Search ................. 156/79, 78; 18/12 F; 264/45, 264/46, 47

[56] References Cited

UNITED STATES PATENTS

| 3,037,897 | 6/1962 | Pelley | 156/79 X |
| 3,257,484 | 6/1966 | Barnette | 264/47 |
| 3,303,617 | 2/1967 | Hessburg, Jr. et al. | 264/46 X |
| 3,301,927 | 1/1967 | Exley et al. | 264/45 |

FOREIGN PATENTS OR APPLICATIONS

| 1,147,029 | 4/1963 | Germany | 264/45 |

*Primary Examiner*—Benjamin A. Borchelt
*Assistant Examiner*—G. E. Montone
*Attorney*—Joseph J. O'Keefe

[57] ABSTRACT

A method of making a foam core sandwich panel suitable for use in the building industry by spreading two horizontal panels with a polyurethane foamable resin, allowing the resin to expand partially, then bringing the panel sections with their foam faces together sandwich style, to a vertical position and allowing the foam to complete expansion, coalesce and gel in this vertical position.

3 Claims, 3 Drawing Figures

PATENTED JUN 6 1972　　　　　　　　　　　　　　　3,668,031

INVENTOR
Bernard J. Bast

METHOD OF MAKING FOAM CORE SANDWICH PANEL

BACKGROUND OF THE INVENTION

This invention relates to a method of making a foam core sandwich panel.

Foam core sandwich panels have a variety of uses, especially in the construction industry, where they are utilized as building sections. A sandwich panel, as the name implies, comprises two congruent, parallel aligned panels often called "skins" of one material with another material between them. Typically, the skins may be of steel with rigid polyurethane foam as the sandwich core.

In the prior art these panels were manufactured by the laminated process or the vertical "pour-in-place" process. Each of these former two methods has certain disadvantages. The laminated panel is expensive to produce because of the steps necessary to cut and shape the foam. This has resulted in the process being generally limited to producing flat, i.e. non-corrugated or non-textured panels. This disadvantage was thought to be overcome by the vertical "pour-in-place" process. In this process the two skins are positioned vertically, in parallel, and a foamable resin, such as uncured polyurethane liquid, is poured into the space between the panels and then allowed to expand, gel and cure in this position. However, the strength of polurethane foam is anisotropic. This means the strength of the foam is greatest in the plane in which the foam has risen. Because of this property, vertical pour-in-place panels tend to fail at the foam-skin interface. This failure is further enhanced by weaknesses due to bubble entrapment at the interface during the foaming stage.

The object of this invention is to provide a method of producing foam core sandwich panels with improved structural integrity and transverse strength.

SUMMARY OF THE INVENTION

I have discovered that the foregoing object can be obtained by placing two panel skins in a horizontal plane, spreading the top side of each with a foamable resin such as polyurethane foam and allowing the foam to partially expand while the panel skins are in the horizontal plane. The panel skins are then changed to a vertical plane, aligned in parallel, with the foam sides facing each other at a distance equal to the desired final foam thickness, and the panel maintained in this position until expansion, coalescence, gelation and curing are essentially complete.

This invention is applicable to a wide range of skin materials such as steel, aluminum, wood or plastic and also to different skin surfaces such as galvanized, etched, abraded or textured. The skin panels may be flat, corrugated or in other generally planar configurations. cl BRIEF DESCRIPTION OF THE DRAWING FIG. 1 is an isometric view of the panel skins coated with the liquid resin, lying on an open butterfly mold;

FIG. 2 is a vertical cross-section of the panel in the mold with the mold closed; and FIG. 3 shows a completed panel.

DESCRIPTION OF THE PREFERRED EMBODIMENT

Figure 1:
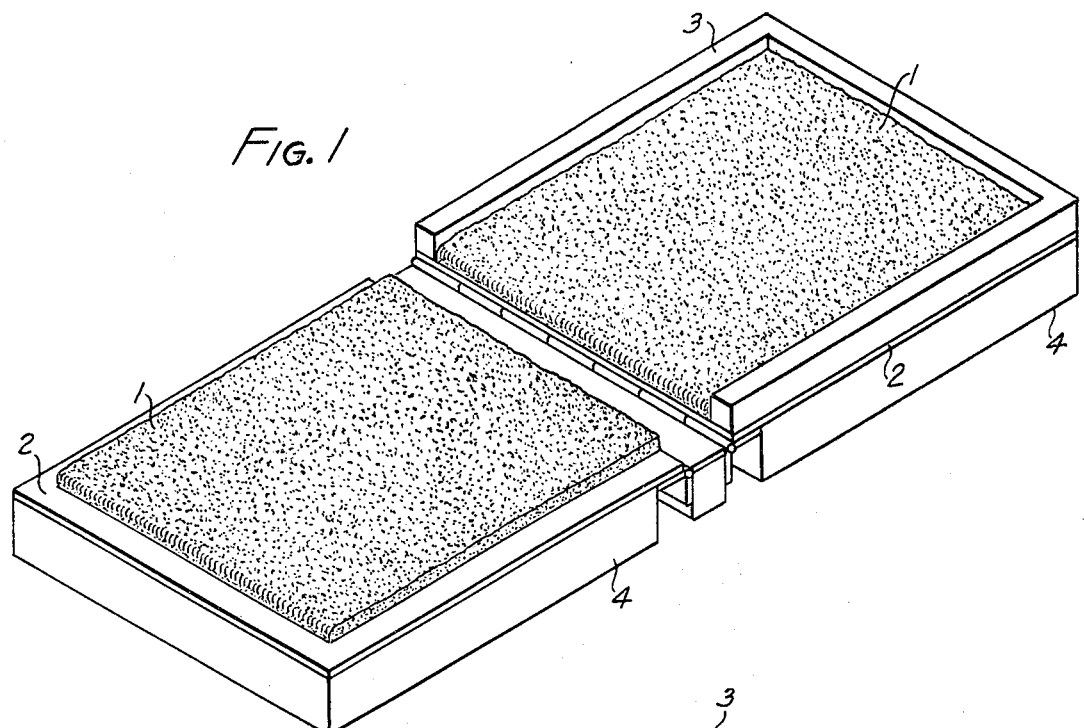
Figure 2:
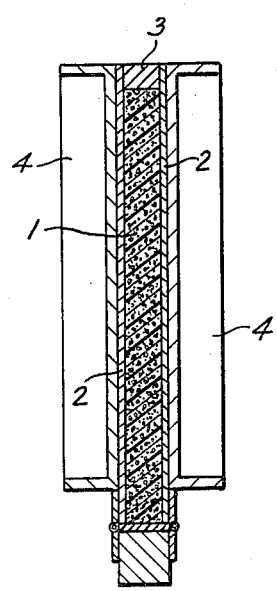
Figure 3:
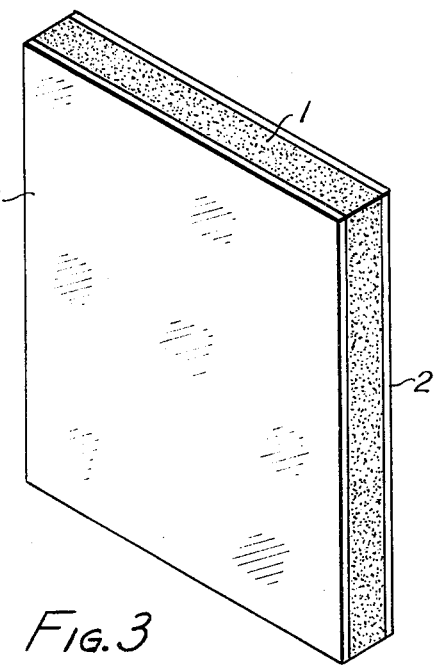

In accordance with the practice of this invention two panel skins are degreased in a conventional manner with a standard degreaser such as a chlorinated hydrocarbon. The skin sides 2 to be coated with foam are then preferably sprayed with commercial adhesive sold for this purpose and layed, sprayed side up, see FIG. 1, on a "butterfly" type mold 4 which is preferably preheated to about 110°-140° F. Although I have used a "butterfly" mold, any means which facilitates panel movement may be substituted. The panel after heating is then coated with a polyurethane foam liquid 2 to a depth of for example, about one-eighth inch. This initial foam depth is a function of the size of the nozzle opening used in the spreading apparatus. It is not critical and thus may be varied depending on apparatus limitations, the viscosity of the liquid foam to be spread, etc. An apparatus suitable for spreading the foamable resin is disclosed in Ser. No 779,535, filed Nov. 27, 1968, entitled "Apparatus for Spreading Foamable Liquids", by F. P. Ayre and D. H. Bachman. The foam polymerizes and expands concurrently, and when the foam has expanded to a depth of for example about one-half inch the mold is then closed, bringing the panel halves to a generally vertical position, as illustrated in FIG. 2, and a peripheral spacer 3, which is the width of the final desired foam thickness, is clamped in place between the panel halves. This spacer also performs the function of maintaining the panel halves in a parallel position. While these operations can be performed at room temperature, the heat from the skin preheating step should be maintained in the mold during the entire operation and serves the double purpose of improving the adhesion at the foam-skin interface and accelerating the curing process. After the foam faces are coalesced (about 20 minutes), the mold is unclamped, and the finished panel is removed and stored until curing is complete, which is, in general, overnight.

In a specific example, a four foot by eight foot steel panel was wiped clean with 1,1,1-trichlorethane and sprayed with a neoprene adhesive (Number G701, Pittsburgh Plate Glass). It was then layed on a butterfly mold which was preheated to about 130° F. After the panel skins became heated, a layer of polyurethane foam was applied to a depth of approximately one-eighth inch over the entire top surface area of the two panel skins. When the foam had expanded to about one-half inch, the mold was closed against a 4 inch peripheral spacer and the halves clamped together with the spacer between them. Heat was maintained in the mold at about 130° F. throughout. In about 15 minutes, the mold was unclamped and the finished panel removed.

The panel thickness is usually from 1 to 4 inches, but this is a variable dependent of the type resin used and the panel thickness desired. The resin itself may also vary. One example of a foamable resin is one whose foaming is the result of an in situ reaction between the polyol and isocyanate and which produces a flexible polyurethane foam. Another, which has a Freon type gas as a foamer produces a polyurethane foam with rigid properties. Underheating and overheating of the panel will produce a bond at the skin-foam interface which has reduced strength.

Also, although it is preferable that the foam spreading step be performed in a horizontal plane position and the coalesce-and-gel step be performed in the vertical plane position, some variation in these positions is possible without departing from the scope of my invention. It is obvious that other such variations may be incorporated into the practice of this invention, such as varying the chemical composition of the foam, altering the density and the density gradient of the foam core, and the application of different primers to increase foam-skin adhesion.

I claim:

1. A method for producing foam core sandwich panel comprising:
    a. applying a layer of foamable resin to a face of first and second panel sheets,
    b. permitting said layer of resin to foam out-wardly from the face of said first and second panel sheets until said resin layers have achieved a predetermined degree of polymerization,
    c. placing said first panel sheet a predetermined distance from said second panel sheet with said first panel sheet foamed layer of resin adjacent, spaced from, and facing said second panel sheet foamed layer of resin, and
    d. maintaining said panel sheets in position until said foamed layers of resin have coalesced and polymerized.
2. The method recited in claim 1 further comprising:
    e. supplying heat to the panel sections in the range from about 110° F. to 140° F.
3. The method recited in claim 2 in which said heat is supplied during steps a through d.

* * * * *